(12) United States Patent  
Fleming et al.

(10) Patent No.: US 8,719,471 B2  
(45) Date of Patent: May 6, 2014

(54) METHOD AND SYSTEM FOR ENHANCED INTERCONNECTIVITY IN VESSEL COMPUTERS

(75) Inventors: James Fleming, Marshall, VA (US); David McKean, White Plains, MD (US)

(73) Assignee: Advanced Fusion Technologies, Lihue, Kauai, HI (US)

( * ) Notice: Subject to any disclaimer, the term of this patent is extended or adjusted under 35 U.S.C. 154(b) by 137 days.

(21) Appl. No.: 12/632,516

(22) Filed: Dec. 7, 2009

(65) Prior Publication Data

US 2010/0146183 A1 Jun. 10, 2010

Related U.S. Application Data

(60) Provisional application No. 61/193,551, filed on Dec. 5, 2008.

(51) Int. Cl.
*G06F 13/12* (2006.01)
*G06F 13/14* (2006.01)

(52) U.S. Cl.
USPC .......... 710/63; 710/62; 710/64; 710/65; 710/66; 710/67; 710/68; 710/69; 710/70; 710/71; 710/72; 710/73; 710/74; 710/305

(58) Field of Classification Search
None
See application file for complete search history.

(56) References Cited

U.S. PATENT DOCUMENTS

| | | | |
|---|---|---|---|
| 6,549,966 B1* | 4/2003 | Dickens et al. | 710/300 |
| 6,615,116 B2* | 9/2003 | Ebert et al. | 701/3 |
| 6,904,530 B2* | 6/2005 | Frank | 713/300 |
| 7,152,134 B2* | 12/2006 | Kinstler | 710/315 |
| 7,216,150 B2* | 5/2007 | Chong et al. | 709/217 |
| 7,546,396 B2* | 6/2009 | Weisser et al. | 710/36 |
| 7,558,903 B2* | 7/2009 | Kinstler | 710/315 |
| 2002/0196181 A1* | 12/2002 | Fall | 342/357.06 |
| 2003/0215102 A1* | 11/2003 | Marlowe | 381/77 |
| 2006/0184615 A1* | 8/2006 | Park et al. | 709/203 |
| 2008/0075292 A1* | 3/2008 | Wong et al. | 381/61 |
| 2008/0077714 A1* | 3/2008 | Wight | 710/18 |
| 2008/0090575 A1* | 4/2008 | Barak et al. | 455/444 |
| 2010/0057827 A1* | 3/2010 | Tawfik | 709/201 |

* cited by examiner

*Primary Examiner* — Henry Tsai
*Assistant Examiner* — Jing-Yih Shyu
(74) *Attorney, Agent, or Firm* — Arent Fox LLP

(57) ABSTRACT

Apparatus and methods are provided for alleviating processing requirements of a central computer in a vessel. Each apparatus is placed in close proximity to one or more pieces of electronic equipment implementing a legacy interface. The apparatus processes data to and from the electronic equipment, including converting data to formats consistent with the formats used by the intended recipient.

13 Claims, 12 Drawing Sheets

METHOD AND SYSTEM FOR ENHANCED INTERCONNECTIVITY IN VESSEL COMPUTERS

CLAIM OF PRIORITY UNDER 35 U.S.C. §119

The present Application for Patent claims priority to Provisional Application No. 61/193,551 entitled "Method and System for Enhanced Interconnectivity in Vessel Computers" filed Dec. 5, 2008, the entirety of which is hereby expressly incorporated by reference herein.

BACKGROUND

1. Field

This application relates generally to computer system architectures in vessels such as aircraft and ships, and more particularly to enhancing the interconnectivity between a central computer architecture associated with software applications and interfaces to on-board electronic equipment.

2. Background

In existing aircraft, ships, and other similar vessels, a central computer is typically provided that interfaces to various electronic equipments that may be located throughout the vessel. Equipment interfaces are generally point-to-point interfaces that use cables to connect each piece of equipment with the central computer. These cables are generally long (e.g., 40 to 100 feet) and heavy (e.g., 25 to 100 pounds). Thus, these long, heavy cables may be run throughout the vessel, taking up useful space and contributing to the weight and thus the fuel efficiency of the vessel.

Typically, the central computer comprises a chassis having a plurality of slots. The majority of the slots are used by interface conversion (IFC) boards which are needed to convert data received from the various electronic equipments into formats compatible with applications in use on the vessel. Thus, little space remains in the chassis for single board computers (SBCs), which may be used to execute various applications utilizing available processing resources. As such, it is difficult to add additional processing resources and applications to the central computer.

There is a need in the art for methods and systems to enhance interconnectivity in vessel computer architectures while reducing the length and weight of cables.

SUMMARY

In one aspect of the disclosure, a system for enhanced vessel computer interconnectivity comprises one or more open system interface converters (OSICs), each OSIC implementing one or more legacy interfaces and having connected thereto one or more pieces of electronic equipment utilizing the legacy interface; a central computer connected to each of the one or more OSICs, the central computer implementing one or more applications, wherein each OSIC is configured to exchange information between the pieces of electronic equipment and the one or more applications, and to convert data to be exchanged into a format consistent with the recipient of the data.

In another aspect of the disclosure, a method of communicating with a central computer on a vessel by an open system interface converter (OSIC) comprises discovering, by the OSIC, one or more subscribers of data generated by one or more pieces of electronic equipment connected to the OSIC and located in close geographic proximity to the OSIC, the one or more subscribers including applications implemented by the central computer; converting the data into a format consistent with the one or more subscribers; and publishing the data to the one or more subscribers.

In yet another aspect of the disclosure, an apparatus comprises a processing system configured to discover one or more subscribers of data generated by one or more pieces of electronic equipment connected to the apparatus and located in close geographic proximity to the apparatus, the one or more subscribers including applications implemented by a central computer also connected to the apparatus; convert the data into a format consistent with the one or more subscribers; and publish the data to the one or more subscribers.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects will now be described with reference to the drawings. In the following description, for purposes of explanation, numerous specific details are set forth in order to provide a thorough understanding of one or more aspects. It may be evident, however, that such aspect(s) may be practiced without these specific details.

Figure 1:
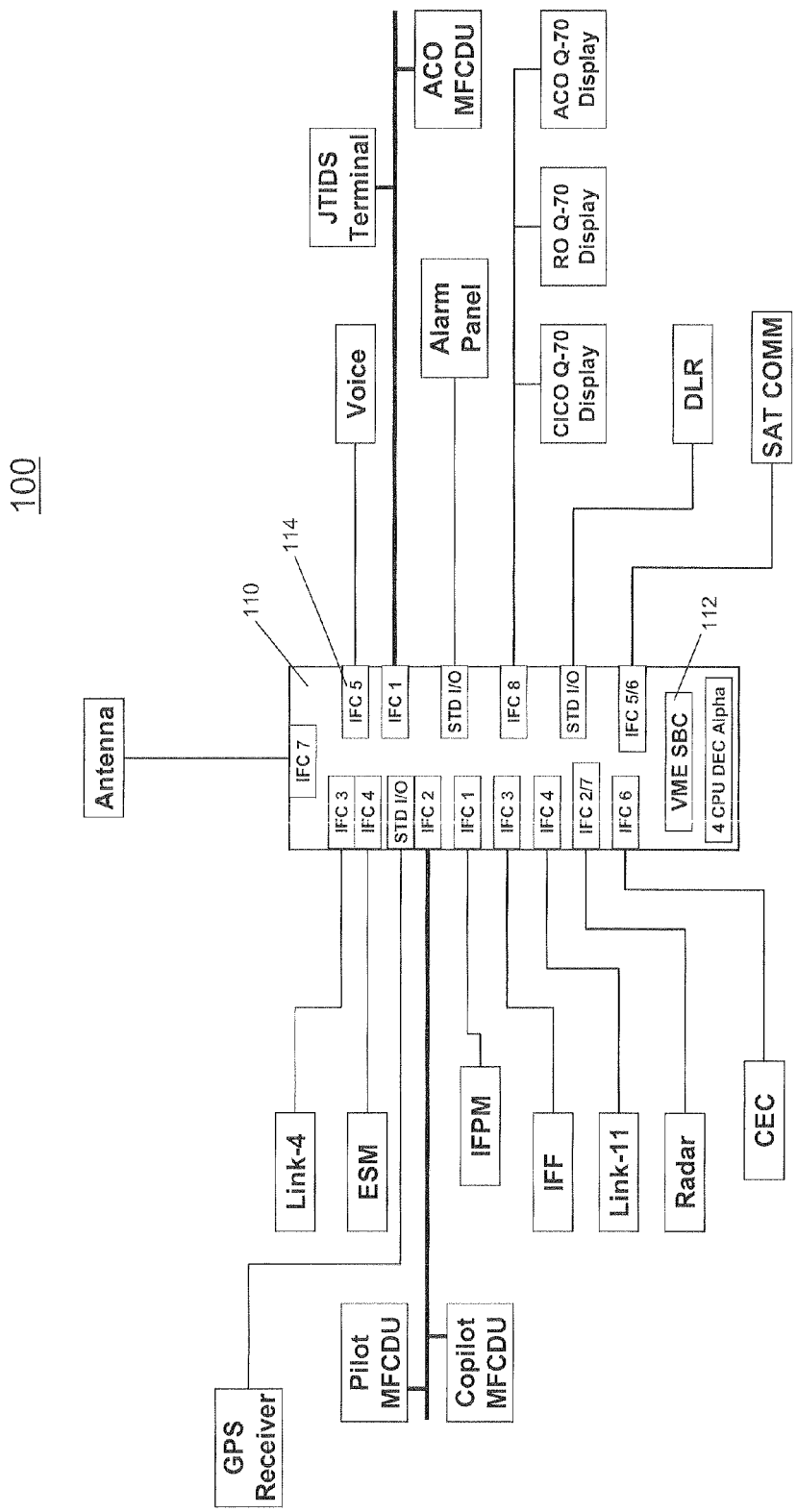
FIG. 1 is a block diagram of a conventional vessel computing system.

FIG. 1 depicts a conventional computer system 100 for a vessel such as an aircraft or ship. Computer system 100 may include a central computer 110 having connected thereto a plurality of electronic equipment. Central computer 110 may comprise a chassis having a plurality of card slots. A single board computer (SBC) 112 may be included in one of the plurality of card slots. A plurality of interfaces 114 are included for connecting to electronic equipment.

Figure 2:
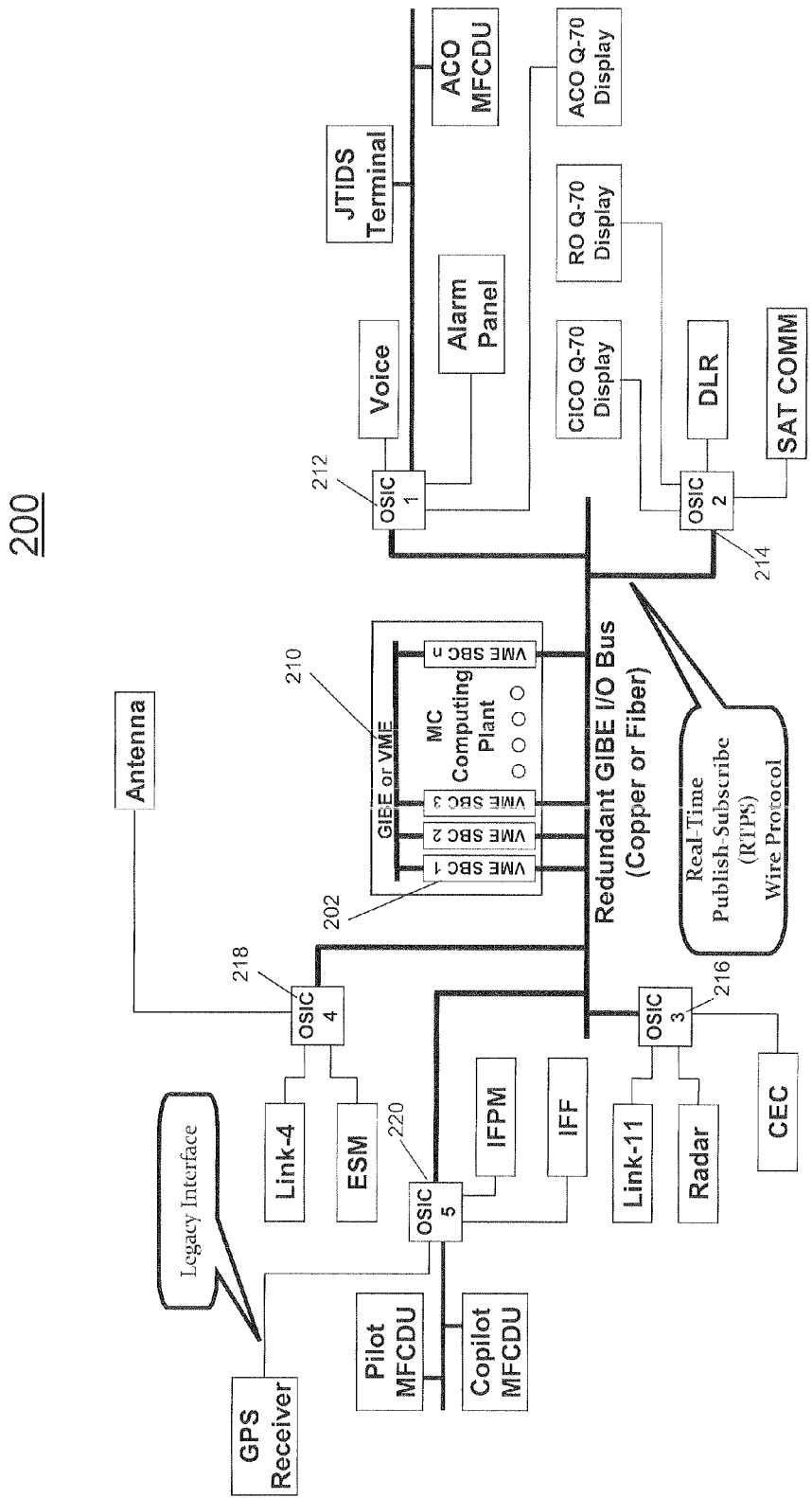
FIG. 2 is a block diagram of an exemplary enhanced vessel computing system, in accordance with aspects of the present invention.

FIG. 2 depicts an exemplary architecture for an enhanced vessel computer system 200, in accordance with aspects of the present invention. Computer system 200 comprises a central computer 210 and a plurality of open system interface converters (OSICs) 212-220. The architecture depicted in FIG. 2 allows for distributed processing of various functions by OSICs 212-220, alleviating some of the processing requirements of the central computer 210. The OSICs may be configured to process data for one or more electronic devices which are connected to it via legacy interfaces. For example, data conversion operations, which in a conventional system are typically performed by a central computer for all connected devices, may now be performed by an OSIC for a particular subset of devices.

As depicted in FIG. 2, each OSIC may have connected thereto one or more pieces of electronic equipment. Electronic equipment may include any equipment typically used in a vessel. For example, electronic equipment may include a radar, a navigation system, one or more multifunctional control display units (MFCDU), electronic surveillance measures (ESM) equipment, an alarm panel, a satellite communications device, a joint tactical information display system (JTIDS), and/or other electronic equipment. The electronic equipment may be connected to the OSIC via a legacy interface, such as, for example, a Mil-Std-1553 interface, HSS, Mil-Std-188-144, Ethernet, Mil-Std-188-203-212, and/or other legacy interfaces. However, because the OSICs are distributed throughout the vessel and in close proximity to the designated equipment, the cables may be shorter in length.

As depicted in FIG. 2, central computer 210 comprises a plurality of SBCs 202. Each slot within the central computer 210 may be used to connect an SBC, thereby allowing the addition of software and processing resources. Each OSIC may communicate with the central computer 210 via a network connection. The network connection may be, for example, a wireless connection or a wired connection. For example, in the case of a wired connection, copper or fiber wires may be used to implement an Ethernet connection. Other wired or wireless network protocols may also be used. In some instances, an OSIC may also connect to the Internet.

Figure 3:
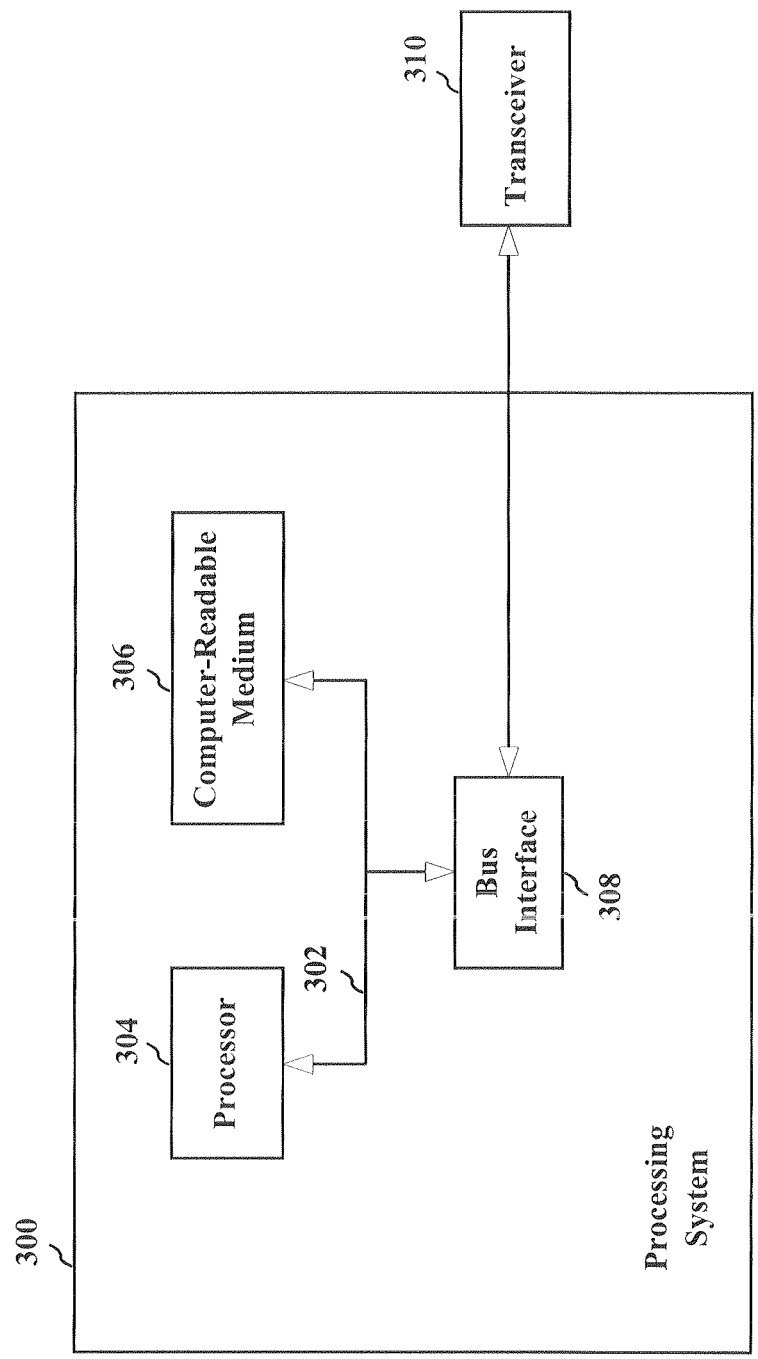
FIG. 3 is a conceptual block diagram of an exemplary OSIC, in accordance with aspects of the present invention.

FIG. 3 is a conceptual block diagram illustrating an example of a hardware implementation of an OSIC employing a processing system 300, in accordance with aspects of the present invention. In this example, the processing system 300 may be implemented with a bus architecture, represented generally by bus 302. The bus 302 may include any number of interconnecting buses and bridges depending on the specific application of the processing system 300 and the overall design constraints. The bus links together various circuits including one or more processors, represented generally by processor 304, and computer-readable media, represented generally by computer-readable medium 306. The bus 302 may also link various other circuits such as timing sources, peripherals, voltage regulators, power management circuits, and the like, which are all known in the art and, therefore, will not be described in further detail. A bus interface 308 provides an interface between the bus 302 and a transceiver 310, in accordance with one exemplary aspect. The transceiver 310 provides a means for communicating with various other apparatus over a transmission medium, in accordance with one exemplary aspect.

The processor 304 manages the bus and performs general processing, including execution of software and/or firmware stored on computer-readable medium 306. The software, when executed by the processor 304, causes the processing system 300 to perform the various functions of the OSIC described herein. The computer-readable medium 306 may also be used for storing data that is manipulated by the processor 304 when executing software and/or firmware.

The functions and methods described herein may be implemented by various modules in the OSIC, central computer, electronic equipment, or other apparatus. As used herein, the term "module" is intended to refer to hardware, firmware, a combination of hardware and software, software, or software in execution. By way of example, a module may be a process, an object, an executable, a thread of execution, a program, an application, a routine, a subroutine, a block of code or instructions, or any other software executed by the processor 304 or by another processing device. In this example, these modules may reside in the computer readable medium 306 which represents a single storage device, multiple storage devices, or other media.

Figure 4:
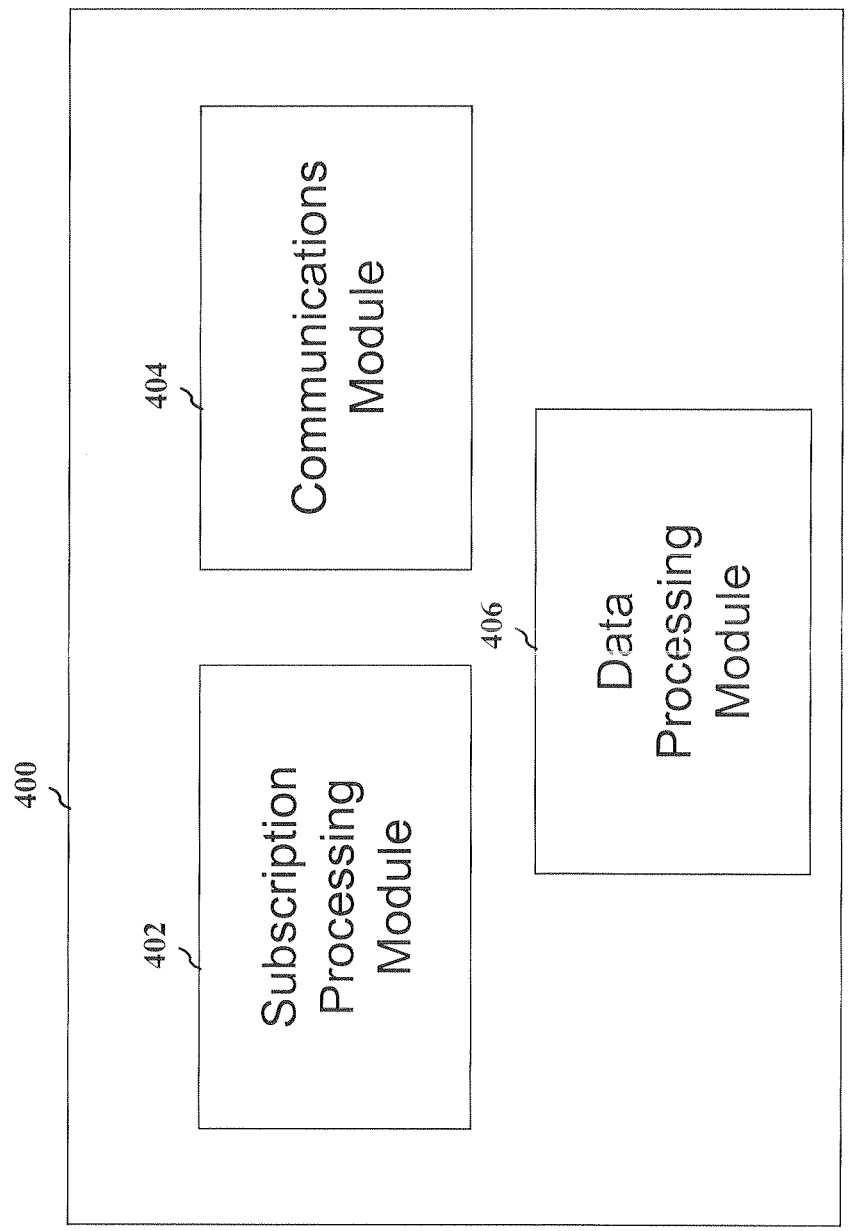
FIG. 4 is a functional block diagram of an OSIC, in accordance with aspects of the present invention.

Various modules to implement the functionality of an OSIC 400, in accordance with aspects of the present invention, will now be presented with reference to FIG. 4. The functions of the plurality of modules may be executed by the processor 304 and may reside in computer readable medium 306, depicted in FIG. 3. OSIC 400 may include, among other modules, a subscription processing module 402, a communications module 404, and a data processing module 406.

An OSIC may be configured to dynamically discover network entity subscribers and publishers using messages and discovery protocols. Subscription processing module 402 may be configured to facilitate subscription processing. As described herein, various entities may serve as subscribers and/or publishers of data. Subscription processing module 402 may be configured to determine which entities are subscribers and which entities are publishers. Though there may be many subscribers for a particular topic or type of data such as, for example, navigation data, each subscriber may have different requirements for the data. Subscription processing module 402 may be configured to determine the Quality of Service (QOS) requirements for each subscriber.

Communications module 404 may be provided to manage communications between OSIC 400 and one or more entities. For example, OSIC 400 may be connected to a central computer, as depicted in FIG. 2. Communications module 404 may be configured to implement one or more protocol stack configurations with the central computer. For example, communications module 404 may use Data Distribution Service (DDS), Real-time Publish-Subscribe (RTPS), Internet Protocol version 4 (IPv4), and/or Internet Protocol version 6 (IPv6) for communicating with the central computer over, for example, an Ethernet connection. Communications module 404 may implement, in place of DDS/RTPS protocols, the Java Messaging Service (JMS) protocol for enterprise computer systems or the Internet Inter-ORB (Object Request Broker) Protocol (IIOP) for computer systems that employ a Common Object Request Broker Architecture (CORBA). Communications module 404 may also implement an Internet Protocol stack comprising Universal Description, Discovery, and Integration (UDDI), Web Service Definition Language (WSDL), Simple Object Access Protocol (SOAP), HTTP/HTTPS, IPv4, and/or IPv6 for communicating with remote computer systems over, for example, an Internet connection.

OSIC 400 may be configured to translate data from one format to another. Data processing module 406 may be configured to translate legacy interface data received to a format compatible with the intended recipient of the network data.

Figure 5B:
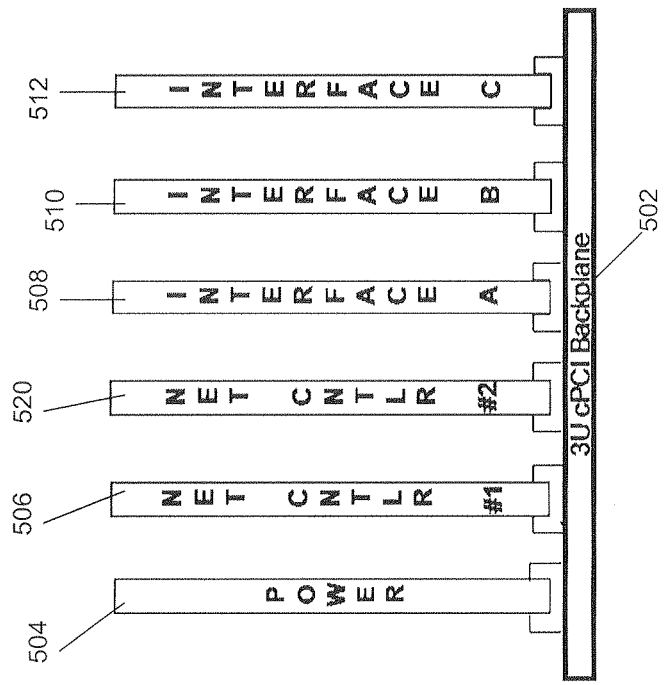
FIGS. 5A and 5B depict exemplary circuit card configurations for an OSIC, in accordance with aspects of the present invention.
Figure 5A:
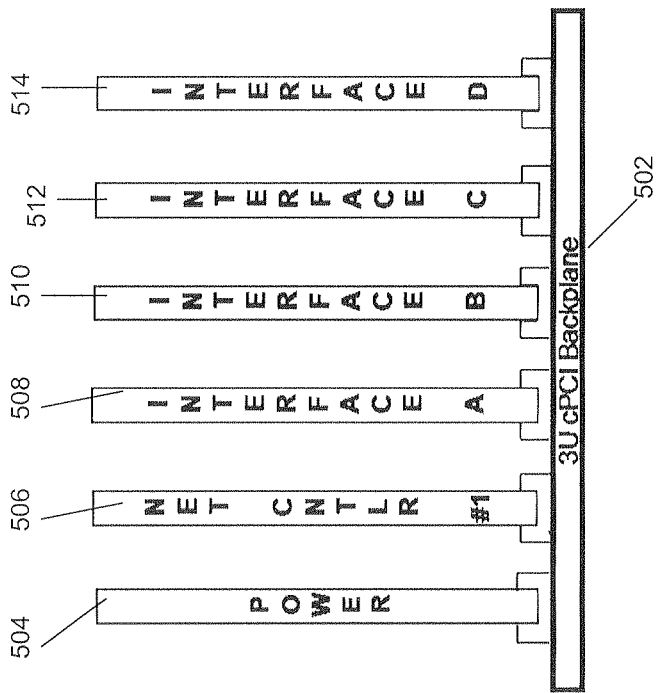

FIGS. 5A and 5B depict two exemplary circuit card configurations for an OSIC, in accordance with aspects of the present invention. It is noted that the circuit card configurations depicted in FIGS. 5A and 5B may include more or less slots for interface circuit cards than are depicted, based on the specific implementation. The configuration is modular, and the specific number of backplane slots and interface circuit cards will be determined based on vessel cooling requirements, space requirements, and/or other implementation-specific requirements.

FIG. 5A depicts a first example which may be used, for example, in an OSIC that does not implement an Internet interface. A circuit card backplane 502 is provided for holding a plurality of circuit cards. Backplane 502 may be, for example, a standard compact peripheral component interconnect (cPCI) backplane. A first card 504 may be a power converter card used to convert power being applied to the OSIC to the appropriate power level for backplane 502. A system controller card 506 may also be provided to implement various control operations for the OSIC. For example, system controller 506 may serve as a network interface, implementing the protocol stack necessary for communications with the central computer. System controller 506 may also control boot-up processes and the operation of interface cards 508, 510, 512, and 514. Additionally, system controller 506 may implement application firmware used to process data received from the interface cards.

Each interface card may be used to connect electronic equipment via one or more legacy interfaces. Each card (508-514) may be configured with all known interface types in some configurations. In other configurations, each interface card may be configured for domain-specific interfaces. For example, an interface card may be configured to implement all airborne interfaces while a second card may be configured to implement all surface (e.g., shipboard) interface types. In either configuration, pin configurations may be used to indicate to the OSIC the particular type of interface to implement. In some configurations, the OSIC may be configured to automatically detect the type of equipment and/or cable that has been connected, and to automatically implement the appropriate interface type settings for the connected equipment/cable.

FIG. 5B depicts a second example which may be used, for example, in an OSIC that implements an Internet interface. Backplane 502 and cards 504 and 506, and interface cards 508-512 may be the same as those depicted in the example of FIG. 5A. The example depicted in FIG. 5B may also include a second system controller 520, which may be configured to implement an Internet interface.

Figure 6:
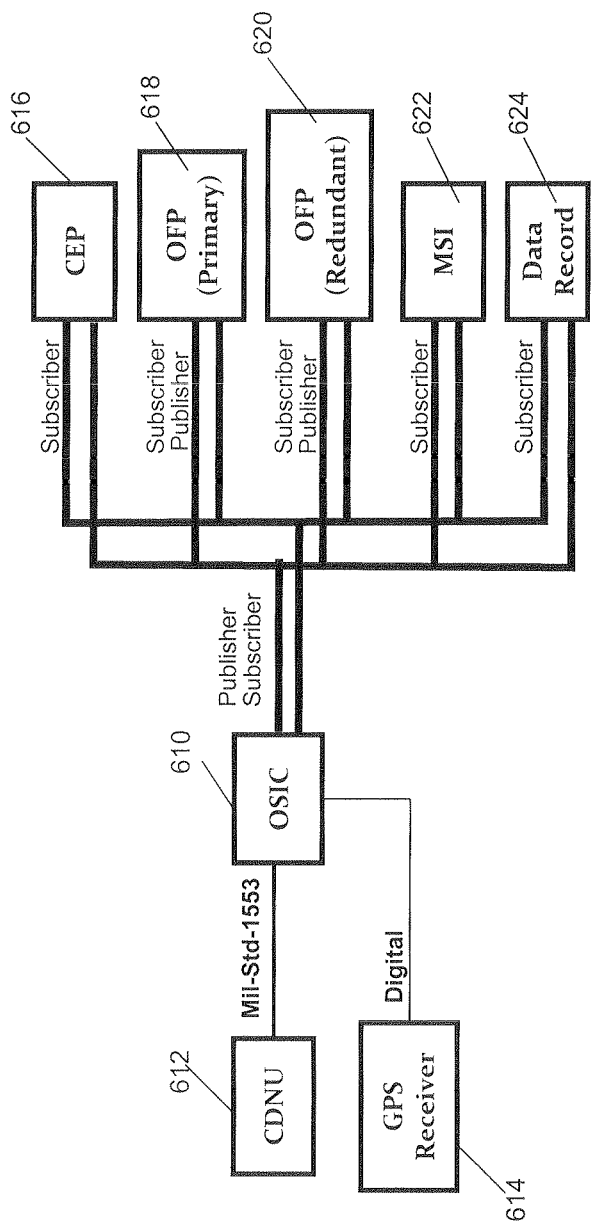
FIGS. 6-8 depict exemplary network architectures for OSIC implementations, in accordance with aspects of the present invention.
Figure 7:
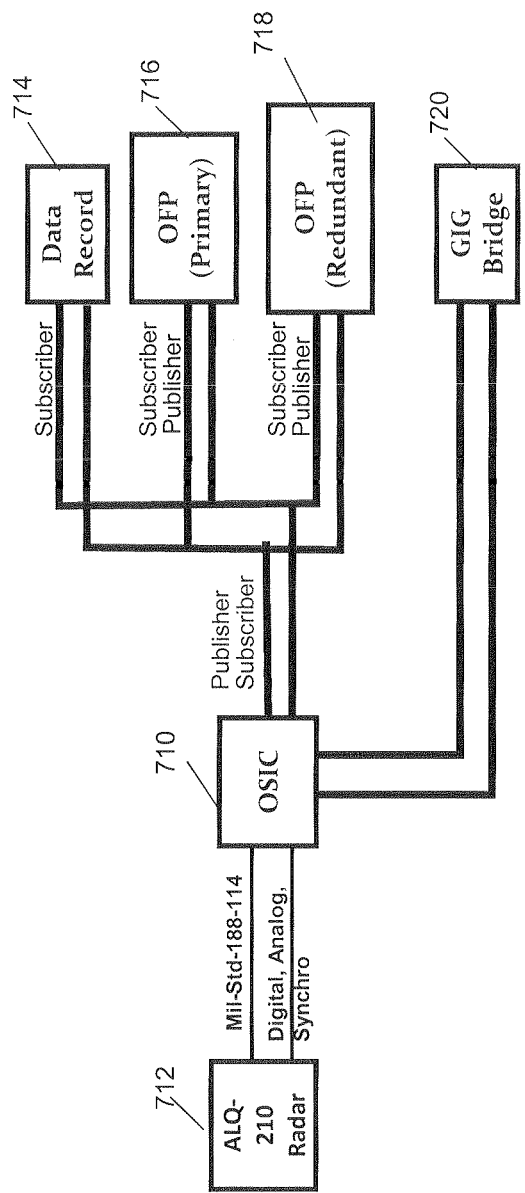
Figure 8:
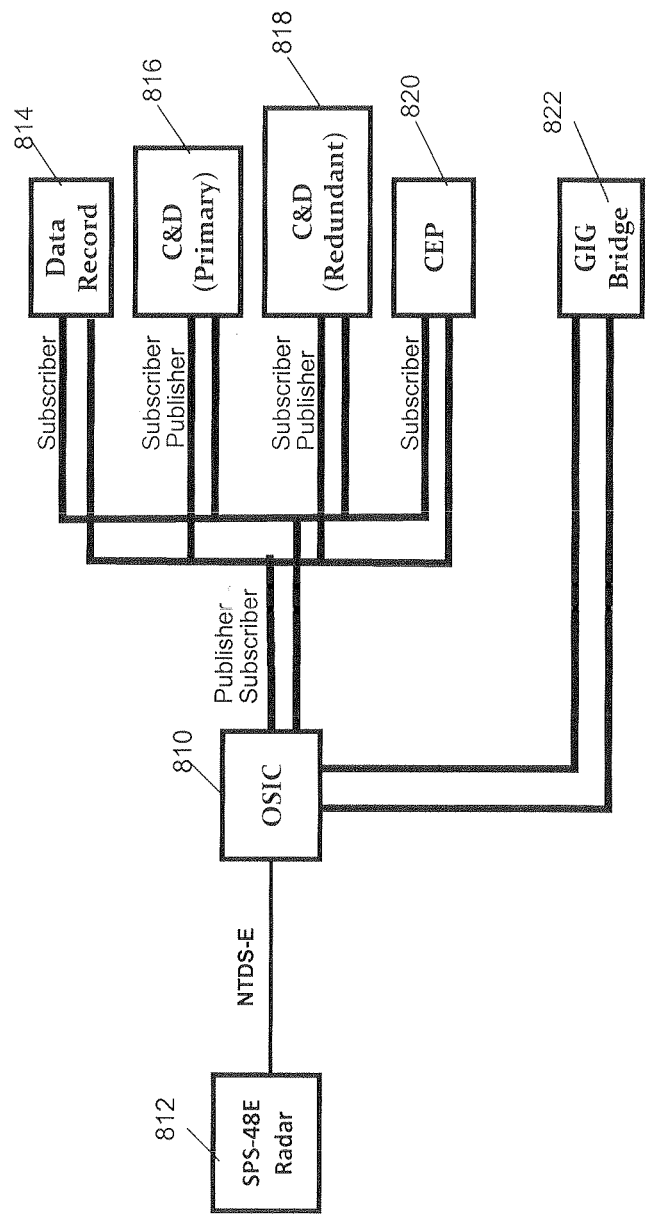

FIGS. 6-8 depict exemplary network architectures wherein an OSIC is connected to particular legacy interfaces, in accordance with aspects of the present invention. FIG. 6 depicts an example wherein OSIC 610 is implementing a Mil-Std-1553 interface. In this example, the Mil-Std-1553 interface connects to a control display navigation unit (CDNU) 612, which is used to control global positioning system (GPS) receiver 614.

OSIC 610 may be configured to discover one or more network entities that are subscribers or publishers of data generated or used by the electronic equipment connected thereto. In this example, OSIC 610 is configured to discover subscribers or publishers of data related to CDNU 612/GPS receiver 614. OSIC 610 also serves as a publisher and/or subscriber of certain data. Via its connection to a central computer, OSIC 610 connects to one or more computers each executing one or more applications. These applications may be run, for example, from SBCs located in the central computer, or from other apparatus. For example, as depicted in FIG. 6, OSIC 610 may interface with a cooperative engagement processor (CEP) application 616, one or more operational flight plan (OFP) applications 618 and 620, a multi-sensor integration application 622, a data record application 624, and/or any other applications which use or provide data related to CDNU 612 and GPS receiver 614.

In the example depicted in FIG. 6, OSIC 610 is both a subscriber and a publisher of navigation-related data. That is, OSIC 610 may obtain data from CDNU 612 and/or GPS receiver 614 and publish the data and status to the discovered subscribers. Additionally, OSIC 610 subscribes to data published by one or more discovered publishers. In this case, OFPs 618 and 620 serve as publishers of navigation control data which may be used by CDNU 612 and/or GPS receiver 614.

In operation, OSIC 610 receives data from one entity, converts the data to format suitable for the intended recipient, and transmits the data to the recipient. While many applications may be subscribers to the navigation/time data as depicted in FIG. 6, each application may have different requirements for how and when it receives the data. In addition to data rate, a number of other QOS parameters may differ for each application. For example, QOS parameters may include, among others, a deadline parameter (i.e., how fast the OSIC should be providing the converted data), a reliability parameter (i.e., if the data is not received, the OSIC will resend the data until it is received or for some predetermined period of time), and a lifespan parameter (i.e., how long the data will be valid). Thus, OSIC 610 may be configured to deliver data to the subscribers in accordance with the selected QOS parameters. OSIC 610 may be configured to provide a consistent time reference for each sample of data published to the subscribers. The OSIC time reference may be derived from an Inter-range Instrumentation Group (IRIG) time code, type B interface input, a GPS Precision Time and Time Interval (PTTI) interface, or via Network Time Protocol (NTP).

Data may be exchanged between the applications and OSIC 610 via Real-Time Publish-Subscribe (RTPS) messages and discovery protocol. The RTPS protocol enables each OSIC to automatically discover each subscribing application expecting to receive data with QOS parameters applicable to each application. OSIC may perform encryption of RTPS messages using a symmetric encryption algorithm such as, for example, Advanced Encryption Standard (AES), or an asymmetric encryption algorithm such as, for example, Rivest/Shamir/Adleman (RSA). Additionally, OSIC may perform user authentication using an authentication protocol such as the Extensible Authentication Protocol (EAP), for example.

FIG. 7 shows another network configuration used for radar data. As depicted in FIG. 7, OSIC 710 is connected via Mil-Std-188-114 to a radar 712. Like OSIC 610, OSIC 710 may be a subscriber and/or publisher of data, and may interface with one or more applications, such as data record 714 and OFPs 716 and 718. OSIC 710 is also configured to send and receive data to and from an Internet interface, such as Global Information Grid (GIG) bridge 720. OSIC 710 may be configured to communicate with GIG bridge 720 via a web services protocol stack, using known protocols such as HTTP, SOAP, WSDL, and UDDI.

FIG. 8 is an example of a network configuration that may be used in a surface vessel, such as a ship, in accordance with aspects of the present invention. As depicted in FIG. 8, OSIC 810 is connected to radar 812 via a Navy Tactical Data System (NTDS) legacy interface. There are various types of NTDS interfaces including, among others, class A (slow parallel protocol), class B (fast parallel protocol), and class E (serial protocol). OSIC 810 interfaces with one or more applications, such as data record 814, one or more command and decision units (C&Ds) 816 and 818, and CEP 820. These communications may be over a network connection such as an Ethernet connection, for example. OSIC 810 is also configured to send and receive data to and from GIG bridge 822.

Figure 9:
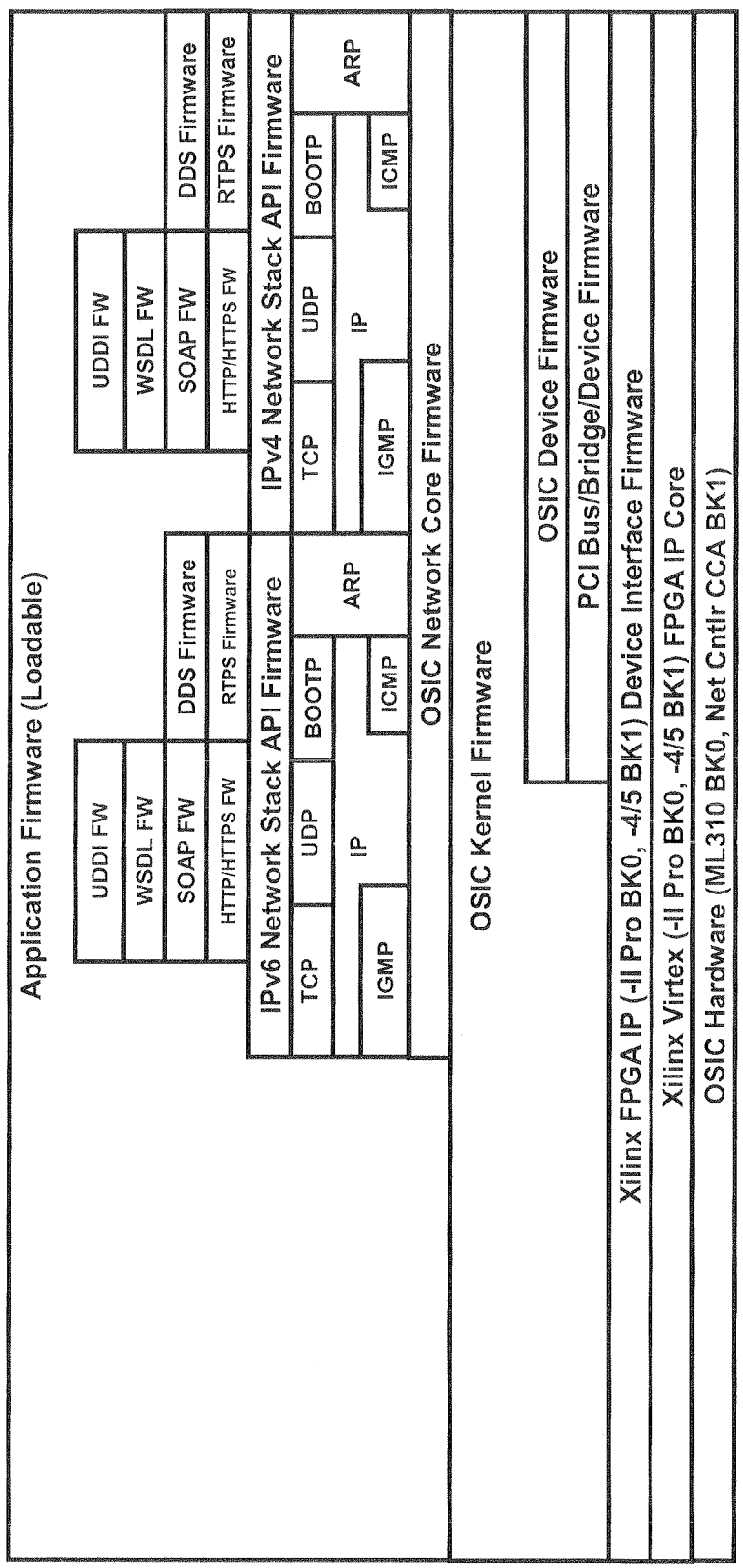
FIG. 9 is a conceptual block diagram illustrating a firmware implementation for an OSIC, in accordance with aspects of the present invention.

FIG. 9 depicts an overview of the firmware that may be used in an OSIC in one exemplary configuration, in accordance with aspects of the present invention. Device specific firmware, such as OSIC device firmware and PCI Bus/Bridge firmware may be provided for implementing firmware necessary for the operation of these devices. OSIC kernel firmware may also be provided that resides permanently in the OSIC to implement kernel operations. As described herein, an OSIC may be configured to implement one or more communication protocol stacks. Thus, as depicted in FIG. 9, protocols for implementing an Internet stack include UDDI, WSDL, SOAP, and HTTP/HTTPS. Protocols for communicating with the various applications include DDS and RTPS. Both protocol stacks operate over IPv4 or IPv6. Encryption and authentication may be provided via the authentication and encryption protocol firmware. In addition, the firmware may comprise a loadable application, which provides functions to convert interface data for each subscriber, manage topic queues and QOS parameters for each subscriber and publisher, manage the IP protocol stack for the network interface, manage the protocol stack for the Internet interface, and manage other network interfaces.

Figure 10:
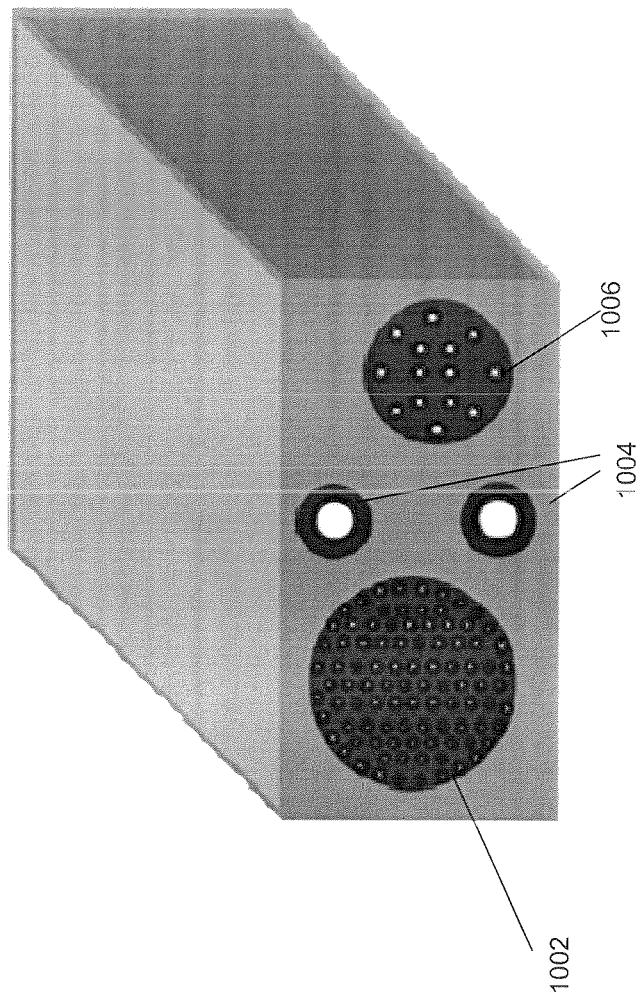
FIG. 10 depicts an physical OSIC configuration, in accordance with aspects of the present invention.

FIG. 10 depicts the physical characteristics of an exemplary OSIC, in accordance with aspects of the present invention. OSIC 1000 may include one or more legacy interface ports 1002. These ports may be used to connect to various types of electronic equipment. OSIC 1000 may also include a plurality of network interfaces 1004. These network interfaces 1004 may include, for example, copper, fiber, wireless, and/or other network types. A power port 1006 may also be included for powering the OSIC components.

Figure 11:
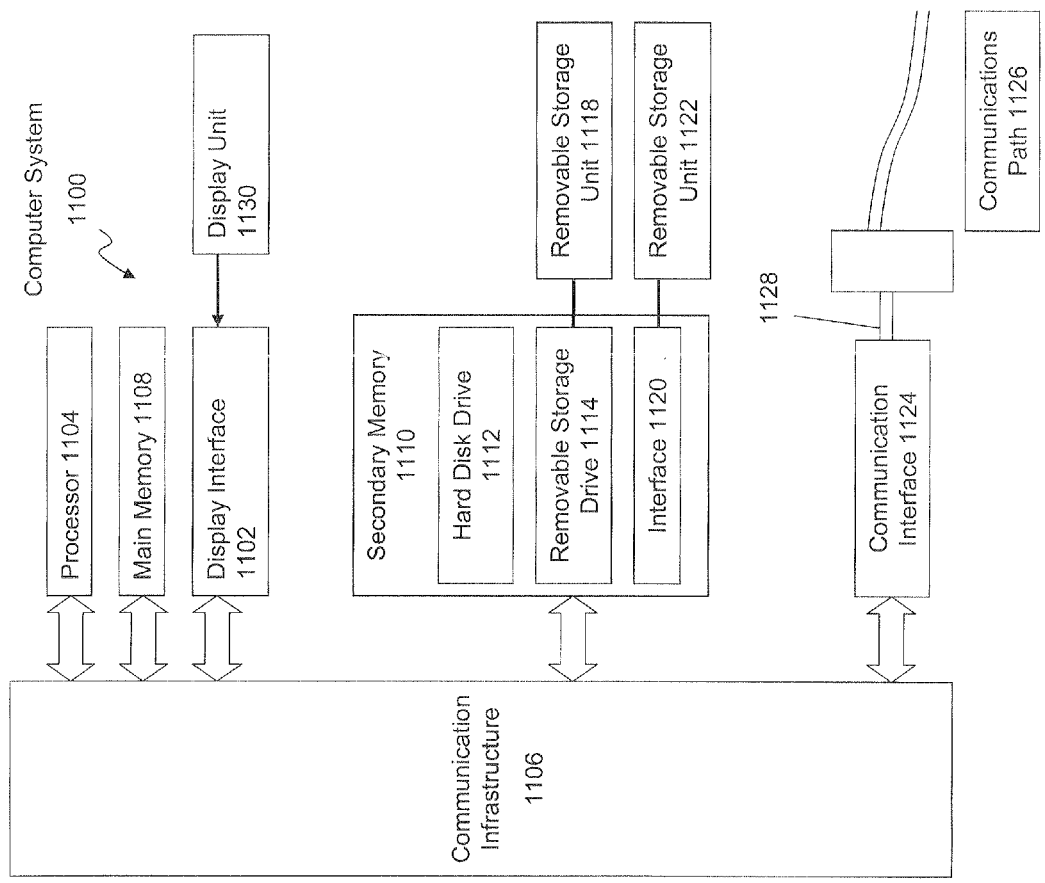
FIG. 11 depicts an exemplary computer system, in accordance with aspects of the present invention.

The present invention may be implemented using a combination of hardware, software and firmware in a computer system. In an aspect of the present invention, the invention is directed toward one or more computer systems capable of carrying out the functionality described herein. An example of such a computer system 1100 is shown in FIG. 11.

Computer system 1100 includes one or more processors, such as processor 1104. The processor 1104 is connected to a communication infrastructure 1106 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 1100 can include a display interface 1102 that forwards graphics, text, and other data from the communication infrastructure 1106 (or from a frame buffer not shown) for display on a display unit 1130. Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc., which is read by and written to removable storage drive 1114. As will be appreciated, the removable storage unit 1118 includes a computer usable storage medium having stored therein computer software and/or data.

Alternative aspects of the present invention may include secondary memory 1110 and may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (e.g., channel) 1126. This path 1126 carries signals 1128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1114, a hard disk installed in hard disk drive 1112, and signals 1128. These computer program products provide software to the computer system 1100. The invention is directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features of the present invention, as discussed herein. In particular, the computer programs, when executed, enable the processor 1104 to perform the features of the present invention. Accordingly, such computer programs represent controllers of the computer system 1100.

In an aspect of the present invention where the invention is implemented using software, the software may be stored in a computer program product and loaded into computer system 1100 using removable storage drive 1114, hard drive 1112, or communications interface 1124. The control logic (software), when executed by the processor 1104, causes the processor 1104 to perform the functions of the invention as described herein. In another aspect of the present invention, the invention is implemented primarily in hardware using, for example, hardware components, such as application specific integrated circuits (ASICs). Implementation of the hardware state machine so as to perform the functions described herein will be apparent to persons skilled in the relevant art(s).

Figure 12:
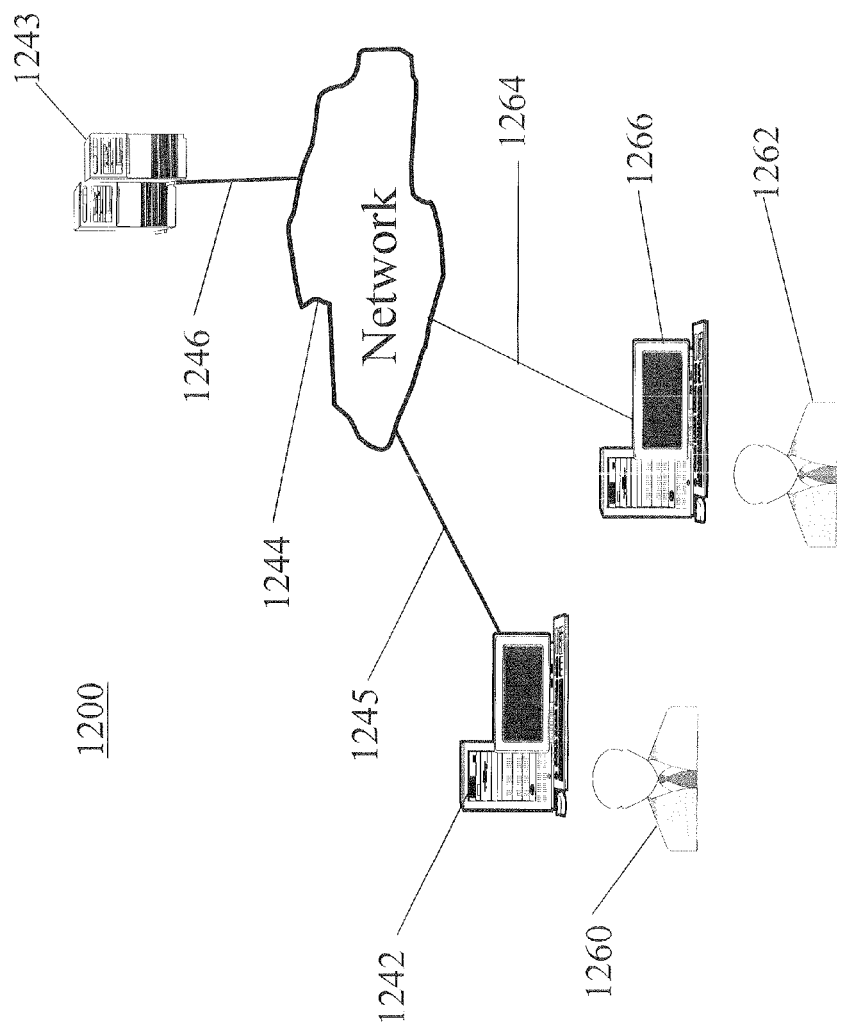
FIG. 12 depicts an exemplary communications system, in accordance with aspects of the present invention.

FIG. 12 shows a communication system 1200 usable in accordance with the present invention. The communication system 1200 includes one or more accessors 1260, 1262 (also referred to interchangeably herein as one or more "users") and one or more terminals 1242, 1266. In one aspect, data for use in accordance with the present invention is, for example, input and/or accessed by accessors 1260, 1262 via terminals 1242, 1266, such as personal computers (PCs), minicomputers, mainframe computers, microcomputers, telephonic devices, or wireless devices, such as personal digital assistants ("PDAs") or a hand-held wireless devices coupled to a server 1243, such as a PC, minicomputer, mainframe computer, microcomputer, or other device having a processor and a repository for data and/or connection to a repository for data, via, for example, a network 1244, such as the Internet or an intranet, and couplings 1245, 1264, 1246. The couplings 1245, 1246, 1264 include, for example, wired, wireless, or fiberoptic links. In another aspect, the method and system of the present invention operate in a stand-alone environment, such as on a single terminal.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A system for enhanced vessel computer interconnectivity, comprising:
    an open system interface converter (OSIC) implementing a legacy interface and having connected thereto electronic equipment utilizing the legacy interface; and
    a central computer connected to the OSIC and implementing one or more applications,
    wherein the OSIC is configured to:
        exchange data between the electronic equipment and the one or more applications of the central computer,
        convert data to be exchanged from a first format used by the electronic equipment into a second format used by the one or more applications,
        determine a set of the one or more applications that are subscribers of data generated by the electronic equipment,
        determine a set of quality of service (QOS) parameters for each of the subscribers,
        publish data to each of the subscribers in accordance with the QOS parameters, and
        provide a consistent time reference for each sample of the data published to each of the subscribers.

2. The system of claim 1, wherein the set of QOS parameters includes at least one of a durability parameter, a durability service parameter, a presentation parameter, a deadline parameter, a latency budget parameter, an ownership parameter, an ownership strength parameter, a liveliness parameter, a time-based filter parameter, a partition parameter, a reliability parameter, a transport priority parameter, a lifespan parameter, a destination order parameter, a history parameter, and a resource limits parameter.

3. The system of claim 1, wherein the OSIC is configured to detect one or more applications that are publishers of data to be used by the electronic equipment.

4. The system of claim 3, wherein the OSIC is further configured to provide a set of QOS parameters to each publisher, and to receive data from each publisher in accordance with the QOS parameters.

5. The system of claim 1, wherein the OSIC is further configured to transmit and receive data via an Internet connection.

6. The system of claim 1, wherein the OSIC is located in close proximity to the electronic equipment connected thereto.

7. The system of claim 1, wherein the OSIC comprises one or more interface cards configured to implement the legacy interface.

8. The system of claim 7, wherein a pin configuration is used to indicate the legacy interface to implement.

9. A method of communicating between a central computer on a vessel and an open system interface converter (OSIC), comprising:
    discovering, by the OSIC, one or more subscribers of data generated by electronic equipment connected to the OSIC and located in close geographic proximity to the OSIC, the one or more subscribers including applications implemented by the central computer;
    converting the data from a first format used by the electronic equipment into a second format used by the one or more subscribers;
    determining a set of quality of service (QOS) parameters for each of the one or more subscribers;
    publishing the data to each of the one or more subscribers in accordance with the QOS parameters; and
    providing a consistent time reference for the data published to each of the one or more subscribers.

10. The method of claim 9, wherein the set of QOS parameters includes at least one of a durability parameter, a durability service parameter, a durability service parameter, a presentation parameter, a deadline parameter, a latency budget parameter, an ownership parameter, an ownership strength parameter, a liveliness parameter, a time-based filter parameter, a partition parameter, a reliability parameter, a transport priority parameter, a lifespan parameter, a destination order parameter, a history parameter, and a resource limits parameter.

11. The method of claim 9, further comprising:
    determining one or more applications that are publishers of data to be used by the one or more pieces of electronic equipment.

12. An apparatus, comprising:
    a processing system configured to:
        discover one or more subscribers of data generated by electronic equipment connected to the apparatus and located in close proximity to the apparatus, the one or more subscribers including applications implemented by a central computer connected to the apparatus;
        convert the data from a first format used by the electronic equipment to a second format used by the one or more subscribers;
        determine a set of quality of service (QOS) parameters for each of the one or more subscribers;
        publish the data to each of the one or more subscribers in accordance with the QOS parameters; and
        provide a consistent time reference for the data published to each of the one or more subscribers.

13. A non-transitory computer-readable medium comprising:
    code for discovering one or more subscribers of data generated by one or more external devices connected to a computer and located in close proximity to the computer, the one or more subscribers including applications implemented by a central computer external to the computer;
    code for converting the data from a first format used by the one or more external devices into a second format used by the one or more subscribers;
    code for determining a set of quality of service (QOS) parameters for each of the one or more subscribers;
    code for publishing the data to each of the one or more subscribers in accordance with the QOS parameters; and
    code for providing a consistent time reference for the data published to each of the one or more subscribers.

* * * * *